United States Patent [19]
Bertram et al.

[11] Patent Number: 4,863,294
[45] Date of Patent: Sep. 5, 1989

[54] LARGE ROLLER BEARING IN THE FORM OF A WIRE BEARING

[75] Inventors: Johannes Bertram, Unna-Billmerich; Heinrich Wolzenburg, Dortmund, both of Fed. Rep. of Germany

[73] Assignee: Hoesch Aktiengesellschaft, Dortmund, Fed. Rep. of Germany

[21] Appl. No.: 266,123

[22] Filed: Nov. 2, 1988

[30] Foreign Application Priority Data

Nov. 14, 1987 [DE] Fed. Rep. of Germany ....... 3738798

[51] Int. Cl.$^4$ .............................................. F16C 19/30
[52] U.S. Cl. .................................... 384/620; 384/622
[58] Field of Search ............... 384/620, 622, 501, 506, 384/569, 564, 581

[56] References Cited

U.S. PATENT DOCUMENTS

| | | | |
|---|---|---|---|
| 3,361,501 | 1/1968 | Messinger et al. | 384/620 |
| 4,168,869 | 9/1979 | Stephan | 384/620 |
| 4,310,205 | 1/1982 | Condon et al. | 384/620 |
| 4,707,151 | 11/1987 | Kaiser | 384/569 |

Primary Examiner—Lenard A. Footland
Attorney, Agent, or Firm—Max Fogiel

[57] ABSTRACT

A large roller bearing in the form of a wire bearing with at least one row of rollers accommodated between rings and rolling around a race made out of wires, whereby at least one row of rollers is resiliently secured by a ring or by part of a ring, characterized in that a race wire rests against a spring disk (9) that is at least partly slit radially and that is secured to a bearing ring by a continuous or segmentally divided retaining ring (11), with a space (13) between the spring disk and the retaining ring in the vicinity of the race.

3 Claims, 1 Drawing Sheet

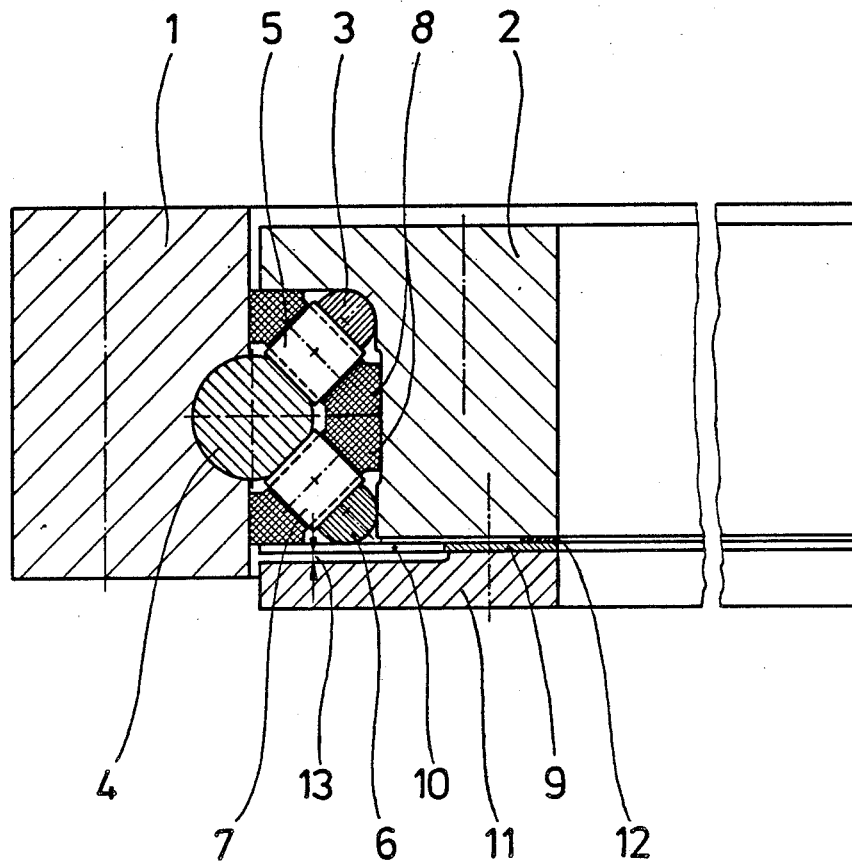

LARGE ROLLER BEARING IN THE FORM OF A WIRE BEARING

The invention concerns a large roller bearing in the form of a wire bearing with at least one row of rollers accommodated between rings and rolling and along a race made out of wires, whereby at least one row of rollers is resiliently secured by a ring or by part of a ring.

Large roller bearings of this type have a prescribed inherent tension or play and a low resistance to torsion.

The retaining row in a two-row bearing described in German Patent 1 041 307 is secured in place by a separate and counteracting ring that is tensioned by cup springs.

German OS 2 829 678 discloses a wire bearing that, since it is subject to the tension of a resilient annular structure, can compensate any heat-generated tolerance deviations that may occur. The use of continuous rings can lead to locally high pressures at the diameter in the vicinity of the roller system (which is to be understood in this context as meaning the rollers and their associated races or cages) when the connective structure is curved, a situation that results in local torsion-resistance peaks and in the extreme case in the destruction of the rollers or races at the pressure sites.

The object of the invention is accordingly to provide a large roller bearing with a slight amount of play or an inherently tensioned roller system that can be used to couple curved connective structures without locally elevated pressures at the circumference and hence locally too high torsion resistances.

This object is attained in accordance with the invention in a bearing of the aforesaid genus in that a race wire rests against a spring disk that is at least partly slit radially and that is secured to a bearing ring by a continuous or segmentally divided retaining ring, with a space between the spring disk and the retaining ring in the vicinity of the race.

The advantage achieved in accordance with the invention consists in particular of a simple design that allows the bearing to be precisley positioned even when it couples curved connective structures such that they can rotate in relation to each other.

One embodiment of the invention will now be specified with reference to the drawing, which is a schematic section through part of the halves of the bearing ring.

A roller system is accommodated between an outer ring 1 and an inner ring 2. Between a supporting wire 3 and an intermediate wire 4 is a row 5 of supporting rollers. Rolling between a retaining wire 6 and intermediate wire 4 is a row 7 of retaining rollers. Cages or intermediaries 8 ensure reliable positioning of the rollers. Retaining wire 6 rests axially against a spring disk 9 that has radial slots 10 slots extending over approximately $\frac{1}{3}$ of its width and can accordingly be considered a pectinate disk, although it can also be composed of individual segments. Spring disk 9 is secured to inner ring 2 by a retaining ring 11, which can also be composed of individual segments. The roller system can be provided with an inherent tension or play by interposing intermediaries 12 spring disk 9 and inner ring 2.

It is preferable for the row of rollers that accommodates the more powerful forces, row 5 of supporting rollers in this case for example, to rest directly against wires in the inner and outer rings. The less stressed row 7 of retaining rollers rests against spring disk 9 and can accordingly remain free of local tolerance peaks. Since the race wires are also separated into segments, they are free to yield locally and follow along with the system. The resilience is limited by a space 13 between spring disk 9 and retaining ring 11. Since the space limits how far the disk can yield, compensation will occur only to a predetermined extent.

Although the particular embodiment specified herein is a bilaterally angular wire roller bearing, the invention can also be employed with other types of roller systems.

We claim:

1. A large roller bearing in form of a wire bearing comprising: a race comprised of wires; rings, and at least one row of rollers accommodated between said rings and rolling along said race; at least one row of rollers resiliently secured by at least part of a ring; a spring disk at least partly split radially, said race resting against said spring disk; a retaining ring for securing said spring disk to a bearing ring; said spring disk and said retaining ring having a space therebetween in vicinity of said race.

2. A large roller bearing as defined in claim 1, wherein said retaining ring comprises a continuous ring.

3. A large roller bearing as defined in claims 1, wherein said retaining ring comprises a segmentally divided ring.

* * * * *